United States Patent [19]
Lindsay

[11] 3,791,792
[45] Feb. 12, 1974

[54] POLYMER CURE DETERMINATION METHOD

[75] Inventor: Newton E. Lindsay, Newbury Park, Calif.

[73] Assignee: Northrop Corporation, Los Angeles, Calif.

[22] Filed: Mar. 29, 1972

[21] Appl. No.: 239,226

[52] U.S. Cl. ............ 23/230 R, 23/230 M, 73/15 R, 73/17, 136/182, 260/47 EA, 260/47 EP, 260/78.4 EP, 260/79.5 PR, 264/40, 324/71 R
[51] Int. Cl. ........................................... G01n 27/00
[58] Field of Search..... 23/230 R, 230 M; 73/15 R, 73/17; 324/71 R

[56] References Cited
UNITED STATES PATENTS

| | | | |
|---|---|---|---|
| 3,049,410 | 8/1962 | Warfield | 23/230 R |
| 3,147,432 | 9/1964 | Warfield | 23/230 R X |
| 3,248,368 | 4/1966 | Biefeld | 23/230 R X |
| 3,248,925 | 5/1966 | Warfield | 23/230 R X |
| 3,258,957 | 7/1966 | Smart | 73/15 R |
| 3,368,384 | 2/1968 | Gatta | 73/15 R |

Primary Examiner—Morris O. Wolk
Assistant Examiner—Sidney Marantz
Attorney, Agent, or Firm—Sokolski, McCormack & Schaap

[57] ABSTRACT

A pair of electrodes formed of dissimilar metals are placed in an uncured resin. As the resin cures, the material produces a dc potential up to several hundred millivolts. The potential can be plotted with time of cure as an indication of the relative rate of chemical activity occurring during the curing period.

8 Claims, 5 Drawing Figures

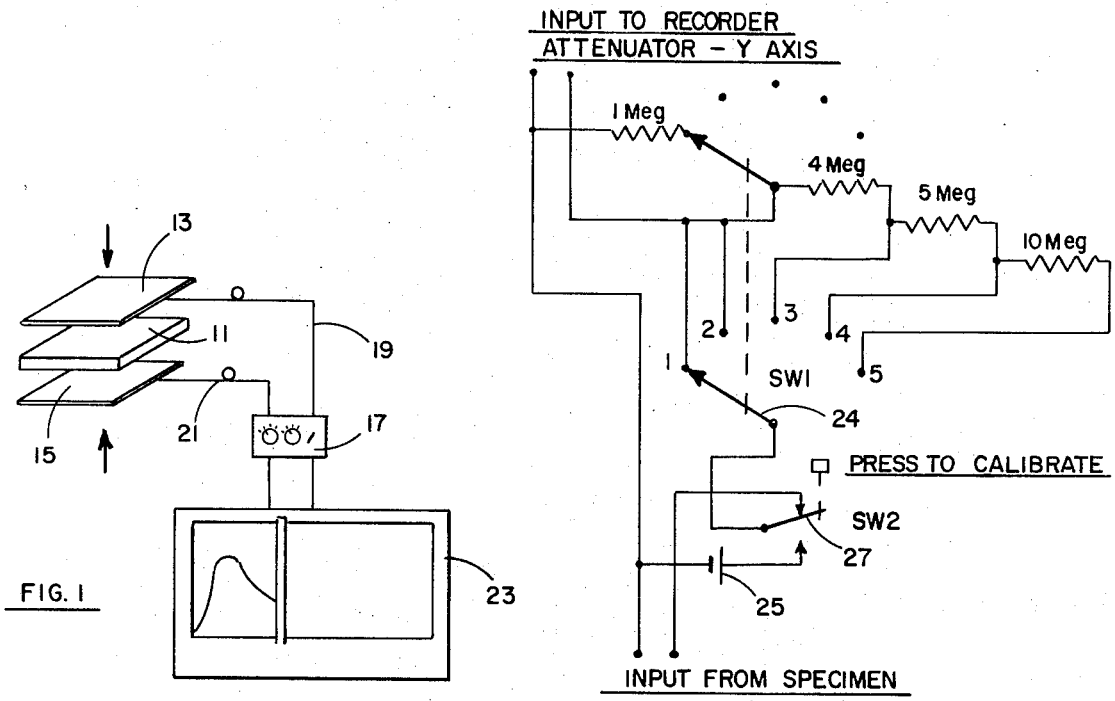
FIG. 1
FIG. 2
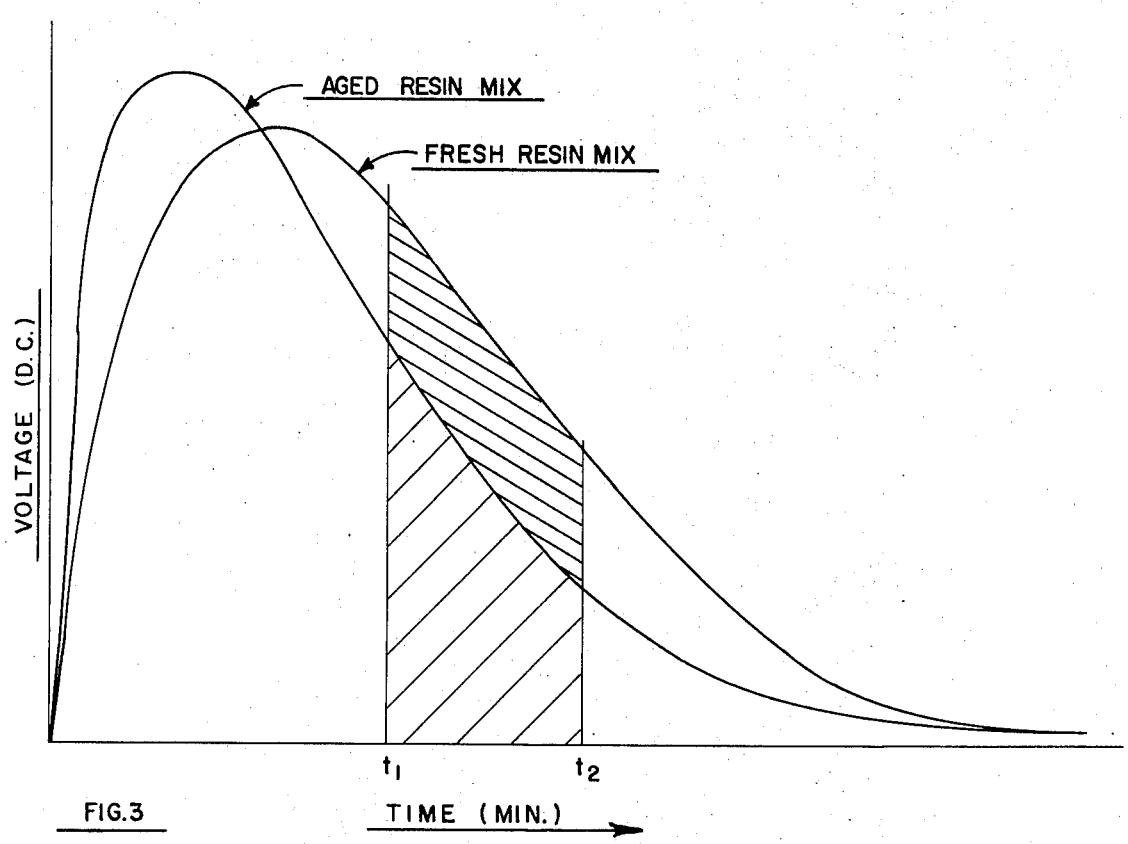
FIG. 3

POLYMER CURE DETERMINATION METHOD

Prior to the herein invention, there has been considerable interest in determining the amount or degree of cure undergone by a resin system. For example, in fiberglass technology, wherein a manufacturer purchases resin pre-impregnated tapes for ultimate winding or layup to form fiberglass products, it is important to note the degree of cure existing in the product when received so that proper further cure conditions can be applied to the tape material. Additionally, it is often desirable to be able to determine at what point a system becomes fully cured so that one can minimize the duration of curing. Mere visual inspection is not satisfactory for so determining the point at which full cure transpires. Thus, some other form of measurement is thus needed.

In U.S. Pat. No. 3,234,462, there is disclosed a method for determining the degree of polymerization of curing in a resin system by applying a unidirectional electric field of predetermined strength across a sample of the material. It has been found that the field enduces a back electromotive force across the sample and that the rate at which the back E.M.F. is developed is related to the degree of polymerization. Further, as indicated in the patent, it was found that the back E.M.F. decayed slowly and the rate at which it decays is related to the degree of polymerization. Thus, this patent discloses a nondestructive means utilizing electrical energy for determining the degree of polymerization.

U.S. Pat. No. 3,248,925 discloses another method of determining the time and temperature conditions for hardening of resin systems, and particularly of plastisols. In this patent, inner and outer concentric electrodes are provided with the space therebetween being filled with the plastisol. A current is induced between the electrodes with the plastisol serving as a capacitor therebetween. As the plastisol hardens, the resistance thereacross changes and increases with time. The change in resistance is measured by a suitable device such as an electrometer. A series of curves can be plotted for the change in resisitivity with time dependent upon varying temperatures of cure. It was found that when the resistivity exhibits only a slight rate of change with respect to time, the hardening reaction had approached substantial completion. This point on the plot thus serves to indicate completion of reaction.

In a further U.S. Pat. No. 2,497,828, the amount of peroxide catalyst utilized to catalyze a polymeric reaction was regulated by the use of two electrodes embedded in a solution of the monomeric material desired to be polymerized. One electrode, for example, would be a platinum wire while the other can be a calomel half cell. The oxidation-reduction potential of the reaction mixture is measured by the use of such electrodes since an oxidation reduction reaction occurs as the peroxide catalyst is added and polymerization occurs. A potentiometer is utilized to measure the change in potential as reaction occurs. In this method it can be seen that suitable oxidation-reduction electrodes are utilized to determine the concentration of the peroxide catalyst rather than the degree of polymerization of the polymer system.

SUMMARY OF THE INVENTION

The herein invention involves a simple process for plotting the degree and rate of cure of polymer systems. It has unexpectedly been found that a dc potential is established when dissimilar metal electrodes are embedded in polymer material. When electrodes such as strips of aluminum and lead foil are placed on opposite sides of an uncured or partially cured specimen, and the electrodes are then connected to a suitable plotting means for plotting potential, it was found that the potential was a relative measure of the rate of chemical activity occurring in a resin system as the material cured. The plot of this activity versus time and temperature can be used for detailed analysis and/or control of a curing system. Various effects are observed with regard to the potential developed in the resin system during the curing period. Such includes the effect of a cure temperature on an output voltage; the effect of pressure which appeared to have no effect, and the effects of the addition of other materials to the resin system such as volatiles and water. The information derived from the curves that can be plotted in accord with this invention can be used for manufacturing control in the production of resins, plastics, pulp products, rubbers and many other materials, and further can be used for controlling manufacturing processes in applying these materials. It is believed that the invention will be further understood from the following detailed description and drawings in which:

BRIEF DESCRIPTION OF THE DRAWINGS

FIG. 1 is a schematic representation of the apparatus of the invention utilized to practice the novel method herein disclosed.

FIG. 2 is a schematic diagram of an input attenuator used in the apparatus of the invention.

FIG. 3 is a plot of voltage versus time obtained from the practice of the herein invention for two different resin mixes.

DESCRIPTION OF THE PREFERRED EMBODIMENTS

Figure 4:
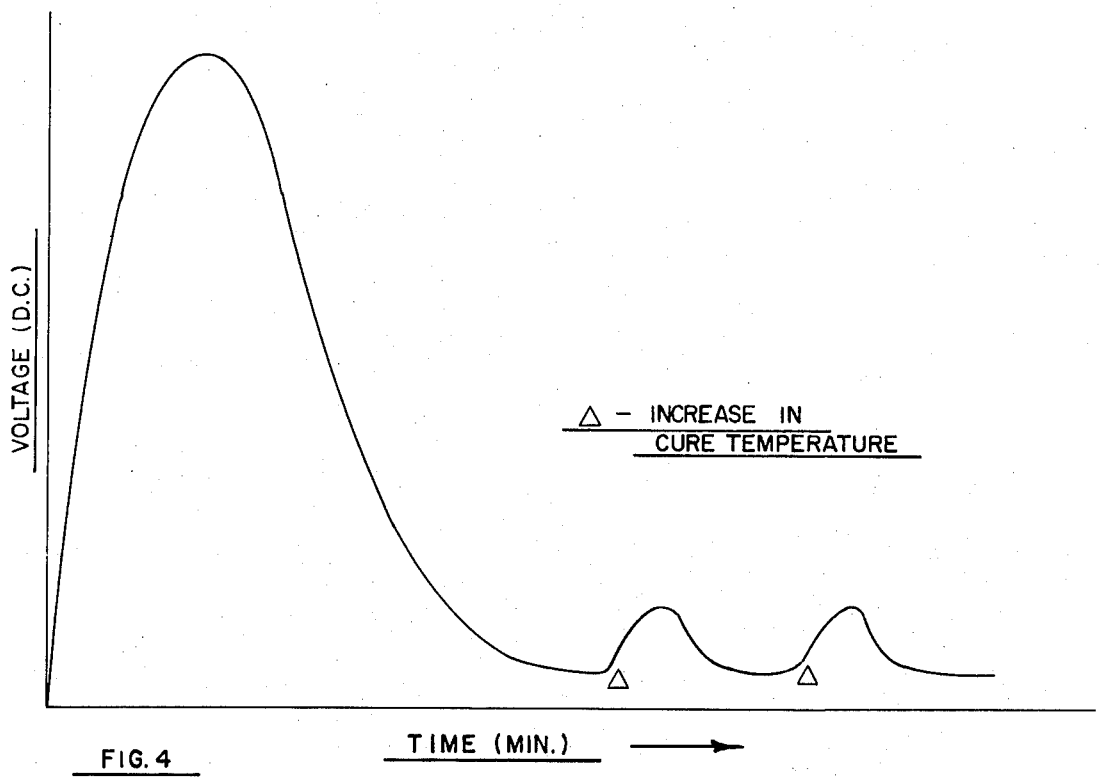
FIG. 4 is a plot of a resin cure showing the effect of temperature changes.

Turning to FIG. 1 there is schematically shown the arrangement of components utilized in the herein invention to practice the method involved. As shown in FIG. 1, a resin sample 11 is disposed between two plate electrodes 13 and 15. In the diagram, the resin would, for example, be a coating on a substrate such as fiberglass cloth or the like, so that the electrodes 13 and 15 can be placed thereagainst and separated thereby. In addition to this arrangement, it should be well understood that the electrodes 13 and 15 can be disposed within a container separated from each other solely by liquid polymeric or monomeric material. The electrodes 13 and 15 may be of any convenient size and shape. It is critical, however, to the invention that they do not touch each other. Therefore, if required, a fine mesh scrim fabric can be disposed on either or both sides of the test specimen 11 when such specimen is extremely thin or one is concerned that there is a possibility for the electrodes to touch each other. The scrim can be made of glass and will thus have no effect upon the output of the electrodes. The electrodes should be large enough to prevent substantial loading by the recording instrument. Where such a loading problem does exist it can be further solved by adjusting the impedance of the recording equipment to a level which does not substantially load the electrodes. An attenuator 17, seen in detail in FIG. 2, can be provided and connected to the electrodes by leads 19 and 21 which can serve as a loading adjustment. The attenuator can contain a standard cell 25 which is used to index the cure graph produced on an X-Y plotter 23 thus assuring repeatability. For example, the input impedance of the X-Y plotter used in the examples of the invention is one megohm. In some instances, this one megohm load is too heavy and loads down the specimen so that little information or "vertical signal" is seen.

Using the impedance matching device FIG. 2, the load across the specimen may be adjusted so that the load will have minimum effect on the graph. However, a few resin systems have very high output and some loading helps with the graphic representation of their cure.

When switch 24 in FIG. 2 is in the first position, a 1 megohm resistor is shunted across the recorder which makes the impedance 500,000 ohms. Position 2 is direct or 1 megohm. Position 3 adds 4 megohms for a total of 5 megohms. Position 4 adds another 5 mogohms. Position 5 adds another 10 megohms, for a total of 20 megohms.

As these higher values are reached for higher sensitivity, the built-in attenuator of the recorder is turned to the lower millivolt ranges and the system is then calibrated by the use of the standard cell by switch 27. Usually set at 1 volt full scale on the recorder.

In the 20 megohm position and the recorder adjusted to one volt full scale, the sensitivity to the specimen cure activity is very high. Very minute changes in temperature, molecular activity, and the like show on the graphs.

The electrodes 13 and 15 must be of dissimilar metals. For example, successful systems have employed lead foil and aluminum foil as the two electrodes. The selection of the metals utilized for the electrodes will depend upon the resin under evaluation and the environment of cure. For example, some materials require relatively inert electrodes such as platinum, gold or stainless steel to avoid contamination of the resin system. The diagram of FIG. 1 shows the electrodes disposed on opposite sides of the specimen 11. Additionally, it has been found that the electrodes can be disposed on the same side of a specimen when only one side is available for monitoring. Thus, for example, a strip or foil of one electrode can be laid on the side of the specimen 11 and a strip or foil of the next electrode can be laid alongside without touching the first electrode. It can be seen that the electric potential is established between the two dissimilar electrodes through the specimen 11. Thus, it should in fact make virtually no difference where the electrodes are disposed as long as they are so separated by the material. Further, it has been found that the distance of separation is not critical. For example, the specimen 11 can be extremely thick of up to one inch or more or it can be very thin. If the specimen has a conductive filler, such as graphite or carbon, the filler itself may be used as one electrode and a second electrode may be placed over a thin scrim of insulative material on any available surface of the specimen. For example, a carbon composite specimen would be polarized positive and an aluminum electrode separated by an insulative scrim would be negative.

It has been found that when dissimilar electrodes are placed in or on a resin, a dc voltage is induced between them. The magnitude of the voltage output obtained will be a function of the resin and the electrodes utilized. It is believed, based upon test results, that the output potential obtained consists of two components. These components of the potential are believed to be an electrolytic component and a molecular ionization one. The electrolytic component appears to exist in most resins whether or not they are curing. The electrolytic component does not appear in styrene and wax-like resins, as well as some thermal setting resins. The electrolytic component is believed to be a measure of the hydrogen-ion level of the material and has been plotted in the neutralization reaction between acids and bases. The molecular ionization component is a function of the chemical activity which occurs when organic bonds are broken and re-established during the curing process. This particular molecular ionization component is seen by observing polarity changes when two similar metal electrodes are utilized.

Because bi-metal electrodes influence the molecular polarization in one direction, the two components above mentioned are believed to be additive rather than random. When the cure temperature is increased, the output voltage will increase because of thermal agitation and molecular ionization of the reacting components. As the resin system cures, both major components of the dc potential, namely the electrolytic component and the molecular ionization ones decrease as the material becomes solid until the reaction is complete. If the reacting components are mixed in the correct proportions, the final potential is low or there is no potential if the specimen is a good dielectric.

If there is an excess of one or several of the components utilized in the resin mixture which excess component serves to prevent complete linking of all available bond sites, a residual voltage substantially above zero may be left after completion of any reaction. It would appear that such residual potentials can be correlated to hardness. For example, a significant residual potential has been noted in adhesive systems where a significant amount of solvent materials remain in the system.

As the resin system cures, a plot of the electrode potential versus time, temperature, or any other variable, may be produced on an X-Y recorder 23 or strip chart recorder. The plots produced by various resin systems are very characteristic to that particular resin system and are often rather complex-particularly with adhesives. The shape of the graph is influenced by such items as the temperature of the cure, the presence of solvents in the resin, the presence of water in the resin, the mixed ratio of the system, and previous aging history of mixed systems. The graph produced is found not to be sensitive to spacing between the electrodes so long as they do not short. Additionally, the graph does not appear to be sensitive to the pressure or pressure changes applied to the resin during cure. Tests have shown that some increases in pressure on the curing resin from a few psi to several thousand psi have had no effect on the cure graph. Plots of resin systems, including polyesters, epoxies, phenolics, polyamides, and filled and unfilled adhesives have been made. To indicate the extent of the herein invention, the following Example will be utilized.

EXAMPLE

In order to demonstrate the full extent of the herein invention, a resin system was selected and studied utilizing different variables. The system consisted of Epon 828 epoxy resin made by Shell Chemical Company, and Versamide 140 polyamide curing agent made by General Mills, Inc. The Versamide is a thermoplastic and reactive polyamide resin which in effect reacts with epoxy resins to copolymerize therewith. Two mixed ratios of epoxy and polyamide were utilized. One mixed ratio contained 70 parts by weight of the epoxy and 30 parts by weight of the polyamide. The other ratio was 50 parts by weight of each of the two ingredients. Both of the two mix ratios or systems were allowed to age at room temperature in 50 gram batches for periods of up to 6 hours before curing and graphing in accord with the herein invention. Cure temperatures between 150°F and 225°F were evaluated. Most of the test data was obtained at 200°F. The effects of both volatile and water additions to the system were included in the study of this example. It was found that water, methylethylketone and acetone became an integral part of the resin system and appeared to combine chemically with the resin. Water tended to speed up the cure rate while acetone tended to retard the cure. The increase in the cure rate with the addition of water occurred up to a level of about 2.5 percent by weight water at which point the water started to retard the cure. The dc voltage potential at any given time during the cure was a measure of the rate of chemical activity and ion level in the resin system at that time. The tests were performed in a heated press. The electrodes were of lead and aluminum. The resin was placed on a double layer of glass cloth which was disposed between the electrodes. The electrodes covered a two by three inch rectangular surface on the impregnated cloth. A Teflon insulator kept the free ends of the electrodes separated.

Since the dc voltage potential, as indicated above, is a measure of chemical activity and ion level, the area included under a cure graph between any two points in time is a measure of the total chemical activity which has occurred in the system at that time interval. As a result, if a flash resin mix is cured it would be anticipated that a high level ionic activity would produce a high dc output. If the resin system was partially cured before starting the final cure process, the ionic activity level would be less than that found in a fresh mix and the voltage output should correspondingly be lower. Thus, if a cure graph of a partially cured resin system and a cure graph of a fresh resin system were made on the same chart, the area under each graph compared for a selected time interval, the graph of the aged resin would be expected to have a small area than the graph of the fresh mix. This was demonstrated in the test performed and is shown in FIG. 3. It is pointed out that there are complications. Any change in volatile content or moisture absorption causes a very large change in the initial voltage as the specimen is placed in a hot press. As a result, the later part of the graph after the peak voltage has been reached is more accurate. However, after the peak voltage output level has been reached the expected area to aging dependency is found. The graph of FIG. 3 shows the area of the curve graph used in the study herein. It was found that the first portion of the graph up to the peak exotherm contains information relative to the system such as volatiles, flow, peak of viscoelasticity and other properties.

Data gathered in the study for the properties of mixed ratio, cure temperature, mixed aging time at room temperature and water content have been correlated against the area under the cure graphs between the pre-selected times $T_1$ and $T_2$ as shown in FIG. 3. Regression analysis has been made on this data and mathematical formulas relating mixed ratio, mixed aging time, cure temperature and water content to the area under the cure graph has been developed. The formulas show regression correlation values of between 91 percent and 99.5 percent, depending upon which variables are entered into the equation. The formula showed that the most important effect is the aging time and that for this system it is a fourth power polynomial function. Formulas have also been generated which relate the above variables to the time required for the resin to reach the peak of viscoelasticity which corresponds to the peak potential in the cure graph. These equations have shown correlations between 85 and 90 percent. Thus, it is believed that the herein graphing technique has permitted for the first time the reduction of resin system curing variables to mathematical formula. As a result, one can then utilize a graph such as shown in FIG. 3 and determine from most any point thereon the various properties of the resin system at that time such as the mix ratio, cure temperature, mixed aging time, water content and the like of the system.

The method of the herein invention can be utilized for manufacturing control in the production of resins, plastics, pulp products, rubbers and many other materials. Further, the herein method can be utilized for controlling manufacturing processes in applying the aforegoing material. For example, test panels made of pre-impregnated material can be instrumented and the cure monitored in an autoclave. Such can then be used to set specifications for controlling the cure time of such pre-impregnated materials, panels and the like, for industrial utilization, and engineering evaluation of resinous materials. Generally in the past, cure cycles were developed by trial and error, guessing and the like. The cure graph established by the herein process permits an engineer to observe in real time the activity of a system undergoing cure. For example, an engineer can study the effects of various cure temperatures upon a resinous system. It has been found that while some resins go to a complete cure to given temperature, others will only cure part way and then become stable. To produce further cure, the temperature must be increased. This is seen, for example, in FIG. 4 which has a resin mixture of 50 parts by weight Epon 828 and 50 parts by weight Shell Chemical Company 1031 epoxy resins made by Shell Chemical Company, 90 parts nadic methyl anhydride and 0.50 parts butyl dimethylamine impregnated on a cloth substrate.

Aluminum and lead electrodes having an effective area on the resin sample of 2×3 inches were used. The impedance across the specimen was 20 megohms. The recorder was set for one volt full scale. The press temperature was 225°F. As can be seen in the graph, there are two 50°F temperature increases. Each temperature increase appeared to produce further curing of the material. A curve of a resin that goes to complete cure at initial cure temperature will not have the two bumps or significant increases in the curve when the temperature is raised as seen in the graph of this figure. In other words, temperature increases will have no significant effect upon the curve after the cure has been achieved.

Figure 5:
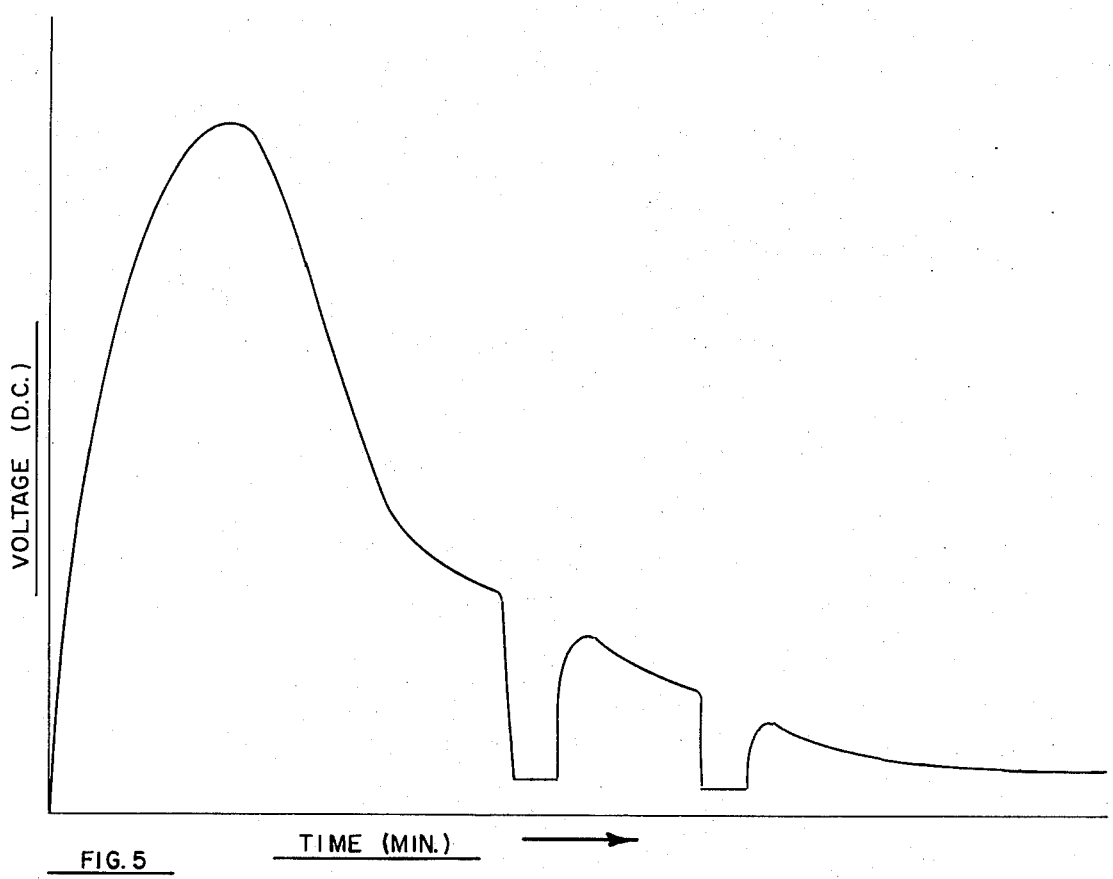
FIG. 5 is a plot of voltage versus time for a resin cure which had been stopped and restarted two times.

FIG. 5 represents a curve of a resin which was being cured in the press at 275°F, using the same step previously described, wherein the cure was stopped and started two times. It can be seen that the general overall curve is maintained and that the restarting of the cure temperature brings the material back to its normal point of origin on the curve. The press was suddenly cooled with water. The specimen was removed from the press to let the press get up to temperature and then the specimen was placed back between the platens.

I claim:

1. A method of determining the cure conditions of a polymer comprising:
   contacting said polymer with a pair of electrodes of dissimilar metals, said electrodes being separated from each other by the polymer,
   connecting the electrodes to a means for indicating a d.c. potential generated by said polymer.

2. The method of claim 1 wherein the electrodes are comprised of aluminum and lead.

3. The method of claim 1 comprising:
   providing said polymer as an uncured liquid in a suitable storage vessel,
   and disposing said electrodes in said vessel.

4. The method of claim 1 further comprising:
   matching the impedance of a specimen to a plotting device with a calibrating load attenuator.

5. The method of claim 1 further comprising:
   subjecting the polymer to cure conditions therefor.

6. The method of claim 5 comprising:
   maintaining said electrodes in contact with said polymer during at least a portion of a curing period,
   and connecting the electrodes to a plotter for plotting the potential change over the period measured.

7. The method of claim 1 comprising:
   impregnating said polymer on a substrate,
   and contacting said substrate with said electrodes.

8. The method of claim 7 further comprising:
   maintaining contact pressure between said electrodes and said substrate.

* * * * *